Patented May 31, 1949

2,471,986

UNITED STATES PATENT OFFICE 2,471,986

STORAGE OF HYDROFLUORIC ACID

Paul M. Waddill, Bartlesville, Okla., assignor to Phillips Petroleum Company, a corporation of Delaware No Drawing. Application March 15, 1946, Serial No. 654,793

5 Claims. (Cl. 260—683.4)

This invention relates to the conversion of hydrocarbons in the presence of hydrofluoric acid as a catalyst. In one specific embodiment the invention relates to the minimization of the loss of hydrofluoric acid in a hydrocarbon conversion process using same as the catalyst. In another aspect this invention relates to the storage of liquid hydrofluoric acid.

Hydrogen fluoride in the form of a liquid, commonly used as highly concentrated or substantially anhydrous hydrofluoric acid, has recently come into prominence as a very important catalyst for numerous organic reactions. For example, it is used alone, or in admixture with a minor amount of boron halide, such as boron fluoride and the like, as a catalyst in the conversion of hydrocarbons by alkylation, isomerization, disproportionation, polymerization, condensation, and the like. It is also used as a refining agent and/or a selective solvent to remove materials, such as organic fluorine compounds, sulfur compounds, and other non-hydrocarbon impurities, from liquid hydrocarbon materials, such as effluents of a hydrocarbon-alkylation step, natural gasoline, lubricating oil fractions, and the like.

Perhaps the most important industrial process at the present time which involves the use of hydrofluoric acid as the catalyst is the alkylation of low-boiling pariffinic hydrocarbons, particularly isobutane and/or isopentane, with alkylating reactants, particularly low-boiling olefins, such as propylene, various butylenes and/or various amylenes, to form normally liquid paraffins which generally have high octane numbers and are quite valuable as constituents of aviation fuel. In such alkylation processes the reactants are intimately contacted at temperatures between about 50 and about 150° F. and under sufficient pressure to maintain the reactants in the liquid phase with liquid concentrated hydrofluoric acid for a reaction period ranging from about 1 to about 30 minutes. The mole ratio of paraffin to olefin in the feed is usually about 3:1 to about 10:1 and as high as 100:1 in the reaction zone itself. The reaction effluents are passed to a settling zone wherein a liquid hydrocarbon-rich phase and a heavier liquid hydrofluoric acid-rich phase are formed and separated. The hydrocarbon phase from the settling zone is subjected to subsequent treatment, as desired, to separate the products of the process and to remove impurities such as organic fluorine compounds therefrom. A portion of the liquid hydrofluoric acid phase from the settling zone is recycled to the reaction zone; while another portion thereof is generally passed to a purification zone for the removal of water and acid-soluble oils present in the acid. This purification of the hydrofluoric acid results in anhydrous acid as a product and a small quantity of an azeotropic mixture of hydrogen fluoride and water as a by-product, and is usually effected by a series of fractional distillation steps. The by-product mixture of hydrogen-fluoride and water is generally discarded because of the relative difficulty accompanying its separation.

Because of the loss of hydrofluoric acid from the process as organically combined fluorine or in the azeotropic mixture of water and hydrogen fluoride, a considerable amount of make-up acid must be added to the system continuously or at intervals. In order to have available make-up hydrofluoric acid at all times, fresh anhydrous hydrofluoric acid is stored in an appropriate vessel from which it is conveyed to the alkylation process when needed. The acid may be conveyed from the hydrofluoric acid storage vessels directly to the reaction zone itself or to the settling zone. The acid is shipped in steel railroad tank cars to the plant where it is being used and stored, and the acid must be transferred from steel tank cars to the acid storage vessel. The transfer of the acid from a tank car to the acid storage vessel is usually accomplished by pressuring the tank car with a gas, such as air, propane or butane, in such a manner that the hydrofluoric acid is forced through the transfer line from the tank car to the storage vessel. In a similar manner the hydrofluoric acid is also pressured from the make-up storage vessel to the alkylation process. The gas or vapor space above the liquid hydrofluoric acid in the tank car and in the storage vessel is filled with the pressuring gas and with whatever hydrogen fluoride that may have vaporized under the conditions of temperature and pressure existing in the storage vessel. Upon venting the storage vessel or tank car, such as at the time of refilling, the vent gas carries with it a considerable amount of hydrogen fluoride which is lost from the system. This loss of hydrogen fluoride constitutes not only an economic loss but also a health hazard. Since hydrofluoric acid has a boiling point of about 20° C. and a relatively high vapor pressure at room temperature and atmospheric pressure, a considerable amount of hydrofluoric acid may be lost by vaporization. It is much to be desired, therefore, to provide a method for the elimination or minimization of the losses of hydrogen fluoride vapor with the gases vented from a storage vessel containing liquid hydrofluoric acid.

It is an object of this invention to minimize the loss of hydrogen fluoride from a hydrocarbon conversion process using same as a catalyst.

Another object of this invention is to provide a method for the storage of liquid hydrofluoric acid.

Still another object of this invention is to decrease the loss of hydrogen fluoride as vapor from an alkylation process in which liquid hydrofluoric acid is stored.

Other objects and advantages of the present invention will become apparent to those skilled in the art from the accompanying disclosure and description.

According to this invention as applied to a process for the conversion of hydrocarbons in the presence of hydrofluoric acid as the catalyst in which a portion of the hydrofluoric acid is lost or discarded and make-up hydrofluoric acid is added to the process from a storage vessel containing fresh liquid hydrofluoric acid, the loss of hydrofluoric acid by vaporization from said fresh acid storage vessel is minimized or prevented by blanketing said liquid hydrofluoric acid in said storage vessel with a liquid layer of a relatively high-boiling hydrocarbon, such as a heavy alkylate.

In one preferred embodiment of this invention in which liquid hydrofluoric acid is stored in a suitable storage vessel for use as make-up hydrofluoric acid in an alkylation process for the production of a relatively light alkylate product and a relatively heavy alkylate by-product, the liquid heavy alkylate by-product of the alkylation process is used to blanket the liquid hydrofluoric acid in a make-up acid storage vessel or tank car to prevent the loss of hydrofluoric acid vapor with the pressuring gas vented from the storage vessel.

A high-boiling hydrocarbon material suitable for use as a blanketing material comprises a highly branched paraffinic hydrocarbon fraction boiling within a range between about 300 and about 600° F. and more preferably within a range about 350 and about 500° F. In particular, a preferred hydrocarbon material comprises a heavy alkylate by-product fraction of an isobutane-butylene alkylation process to which this invention is applicable. However, the heavy alkylate fraction may be obtained from any other conveniently available source without departing from the scope of this invention.

Since the density of liquid hydrofluoric acid, which at approximately atmospheric temperature and pressure is about the same as that of water, is greater than the density of the liquid hydrocarbon blanketing material, the hydrocarbon material will float on top of the liquid hydrofluoric acid, a fact which results in the separation of the liquid hydrofluoric acid layer from the vapor space in the storage vessel. The liquid blanketing layer of heavy alkylate may range in thickness from 1 to 3 or even 4 inches. In general, it is preferred to use a thickness just sufficient to prevent substantial diffusion of hydrogen fluoride vapor from the liquid hydrogen fluoride layer through the liquid heavy alkylate layer into the vapor space above. It has been found that in most instances a one inch layer is sufficient to prevent or at least minimize the loss of hydrogen fluoride when the temperature of the vessel is below 100° F. and sufficient pressure exists in the vessel to maintain the normally liquid constituents in the liquid phase.

The principle involved in the present invention, although not limiting this invention in either its application or function, is believed to be based on the fact that hydrogen fluoride diffuses through relatively high-boiling hydrocarbons, such as a heavy alkylate, at a substantially slow rate. The presence of the protecting hydrocarbon layer over the hydrogen fluoride liquid prevents rapid diffusion of hydrogen fluoride into the vapor phase but does not materially decrease the vapor pressure of the system.

The following is a typical example of an application of the present invention to a process for the alkylation of an alkylatable hydrocarbon with an olefin to produce a relatively light alkylate product fraction and a relatively heavy alkylate by-product fraction. A suitable and typical feed stock having approximately the following composition is alkylated in the presence of hydrofluoric acid in a reaction zone.

| Component | Mol per cent |
| --- | --- |
| Isobutane | 68 |
| Isobutylene | 4 |
| Normal butylene | 7 |
| Butane | 20 |
| Other hydrocarbons | 1 |
| | 100 |

The reactant and hydrofluoric acid alkylation catalyst are intimately contacted in the reaction zone. The overall mol ratio of isoparaffin to olefin is usually from about 4:1 to about 20:1 in the combined feed and recycle, and much higher in the reaction zone itself. The time of residence of the reaction mixture in the reaction zone is usually from about 5 to about 15 minutes but it may be shorter or longer as desired. The volume ratio of acid to hydrocarbon is between approximately 0.5:1 and 2:1, generally about 1:1. The reactants in the reaction zone are maintained at a temperature between about 75 and 90° F. and at a pressure sufficiently high to maintain the reactants in the liquid phase.

A hydrocarbon conversion effluent is withdrawn from the reaction zone and is passed to a settling zone in which the effluent is separated into two liquid phases, a lighter hydrocarbon-rich phase and a heavier hydrogen fluoride-rich phase. The hydrogen fluoride-rich phase is withdrawn from the bottom of the settling zone and recycled as the catalyst for the alkylation reaction. A portion of the liquid hydrogen fluoride-rich phase may be passed to a purification system which may comprise a series of distillation columns, the first of which removes acid soluble oils as a bottom product and water and hydrogen fluoride as an overhead product, and the second of which separates the water and hydrogen fluoride into an anhydrous hydrogen fluoride overhead product and an azeotropic mixture of hydrogen fluoride and water as a bottom product. The azeotropic mixture of water and hydrogen fluoride is discarded but the anhydrous hydrogen fluoride is recycled to the reaction zone.

The liquid hydrocarbon-rich phase passes from the settling zone to an azeotropic distillation column in which dissolved hydrogen fluoride in the hydrocarbon phase is removed as an overhead product from said azeotropic distillation column along with relatively low-boiling hydrocarbons, such as isobutane and propane. A bottom product comprising a light alkylate product containing isooctane and a heavy alkylate by-product is removed from the azeotropic distillation column. The overhead product of hydrogen fluoride and relatively low-boiling hydrocarbons is condensed and the resulting condensate is passed directly to the reaction zone itself or to the settling zone or through a scrubbing zone for removal and venting of light hydrocarbons and hydrogen fluoride.

Before separation of the light alkylate, the heavy alkylate by-product and any relatively light hydrocarbons from the bottom fraction of the azeotropic distillation column, this fraction is treated by contact with bauxite to remove organically combined fluorine therefrom. It is necessary to remove such organically combined fluorine from the hydrocarbon material in order to prevent corrosion of subsequent equipment. After treatment the bottom fraction from the azeotropic distillation column is usually passed to a series of distillation columns for the separation of a relatively light hydrocarbon fraction comprising isobutane, normal butane, propane, etc., an intermediate fraction comprising light alkylate, such as isooctane and some heptanes and hexanes, and a heavy fraction comprising the heavy alkylate by-product. The heavy alkylate fraction has a boiling range within about 300 and about 600° F. and comprises highly branched paraffinic hydrocarbons.

A storage vessel is supplied for storing fresh anhydrous hydrofluoric acid for use as make-up acid in the alkylation process. Acid from the storage vessel is conveyed or transferred to the settling zone as make-up acid by pressuring the storage vessel with propane; thus the use of corrosive resistant pumps is eliminated. According to this invention in order to prevent the loss of hydrogen fluoride in the vapor phase of the acid storage vessel, a portion or all of the heavy alkylate fraction is passed to the acid storage vessel to form a liquid layer of heavy alkylate over the liquid hydrofluoric acid in that vessel. A liquid layer of heavy alkylate between about 1 and about 3 inches in thickness is preferred to prevent a substantial loss of hydrogen fluoride as the vapor in the propane vapor phase above the hydrofluoric acid liquid.

Without the use of a blanketing layer of a relatively high-boiling hydrocarbon on the liquid hydrofluoric acid in the storage vessel approximately 0.3 volume per cent of the hydrofluoric acid in the vessel is in the vapor phase when the vapor space above the hydrofluoric acid liquid is filled with a pressuring gas, such as propane. For example, if 50 cubic feet of liquid hydrogen fluoride is displaced by 50 cubic feet of propane vapor, the hydrogen fluoride in the vapor form is 0.3 per cent of the amount of hydrogen fluoride displaced from the storage vessel.

This invention is applicable to various vessels and containers which contain a liquid phase of hydrofluoric acid, such as railroad tank cars, drop out tanks, etc. Thus, in any process in which a substantial portion of liquid hydrogen fluoride is accumulated the loss of hydrofluoric acid in the vapor above the liquid may be minimized by introducing a relatively heavy hydrocarbon material, such as a heavy alkylate fraction, over the liquid hydrofluoric acid to blanket the same and to prevent or minimize the loss of hydrogen fluoride by vaporization. The present invention may also be applied to various other hydrocarbon conversion processes than alkylation in which hydrogen fluoride is present or used in the liquid phase. The fact that the present invention has been described in particular with regard to the alkylation of relatively low-boiling hydrocarbons in the presence of hydrofluoric acid as the catalyst is not considered limiting to this invention.

Having described my invention, I claim:

1. In a process for the conversion of hydrocarbons in the presence of hydrofluoric acid as a catalyst in which a portion of the hydrofluoric acid is added to the process from a storage vessel, the method for minimizing the loss of hydrofluoric acid from said acid storage vessel and for confining the acid to a lower liquid phase therein which comprises substantially maintaining said hydrofluoric acid in liquid phase under an atmosphere of inert pressuring gas and introducing between said acid layer and said atmosphere of pressuring gas a liquid layer of a heavy paraffinic hydrocarbon fraction through which said hydrofluoric acid is undiffusible to further prevent vaporization and the diffusion of acid vapors into the pressuring gas and to maintain said acid in the liquid phase.

2. The process according to claim 1 in which said hydrocarbon fraction is highly branched paraffinic hydrocarbons boiling between about 300 and 600° F. and in which the hydrocarbon layer has thickness between about 1 and 3 inches.

3. In the process for the alkylation of isobutane with butylene in the presence of hydrofluoric acid as an alkylation catalyst and under alkylation conditions such that a relatively light alkylate product and a relatively heavy alkylate by-product are produced and in which a portion of the acid is lost and make-up hydrofluoric acid is added to the process from a storage vessel, the method for minimizing the loss of hydrofluoric acid from said storage vessel and for confining the acid to a lower liquid phase therein which comprises substantially maintaining said hydrofluoric acid in liquid phase under pressure of an inert gas and introducing between said acid layer and a resulting upper gas layer a liquid layer of said heavy alkylate by-product of the alkylation reaction.

4. The process according to claim 3 in which said heavy alkylate boils between about 350 and 500° F. and in which said layer is between about 1 and about 3 inches in thickness.

5. The method for minimizing the loss of hydrogen fluoride by vaporization from a storage vessel containing liquid hydrofluoric acid and for confining the acid to the lower liquid acid layer therein which comprises substantially maintaining said hydrofluoric acid in liquid phase under pressure of an inert gas and introducing between said acid layer and said pressuring gas a liquid layer of heavy alkylate hydrocarbon in which said liquid hydrofluoric acid is immiscible and through which vapors of said hydrofluoric acid are undiffusible whereby vaporization of said acid and diffusion of said vapors into the pressuring gas is prevented.

PAUL M. WADDILL.

REFERENCES CITED

The following references are of record in the file of this patent:

UNITED STATES PATENTS

| Number | Name | Date |
| --- | --- | --- |
| 2,267,730 | Grosse et al. | Dec. 30, 1941 |
| 2,376,051 | Hachmuth | May 15, 1945 |
| 2,378,439 | Schlesman | June 19, 1945 |
| 2,378,636 | Iverson | June 19, 1945 |
| 2,400,386 | Bolinger et al. | May 14, 1946 |
| 2,403,922 | Hawthorne | July 16, 1946 |